United States Patent
Reynders, III (10) Patent No.: US 11,144,847 B1
(45) Date of Patent: Oct. 12, 2021

(54) REINFORCEMENT LEARNING USING OBFUSCATED ENVIRONMENT MODELS

(71) Applicant: Latent Strategies LLC, Newton, MA (US)

(72) Inventor: John Van Wieheren Reynders, III, Newton, MA (US)

(73) Assignee: Latent Strategies LLC, Newton, MA (US)

( * ) Notice: Subject to any disclaimer, the term of this patent is extended or adjusted under 35 U.S.C. 154(b) by 0 days.

(21) Appl. No.: 17/231,443

(22) Filed: Apr. 15, 2021

(51) Int. Cl.
*G06N 20/00* (2019.01)
*A63F 13/40* (2014.01)
*G06N 3/00* (2006.01)

(52) U.S. Cl.
CPC .............. *G06N 20/00* (2019.01); *A63F 13/40* (2014.09); *G06N 3/006* (2013.01)

(58) Field of Classification Search
USPC .................................................. 434/28, 112
See application file for complete search history.

(56) References Cited

U.S. PATENT DOCUMENTS

| | | | | |
|---|---|---|---|---|
| 9,116,880 B2* | 8/2015 | Dolan | ...................... | G06F 40/40 |
| 9,613,310 B2* | 4/2017 | Buibas | ...................... | G06N 3/04 |
| 10,512,834 B2 | 12/2019 | Joshi et al. | | |
| 2020/0293883 A1* | 9/2020 | Budden | .................. | G06N 3/006 |
| 2021/0042630 A1* | 2/2021 | Roberts | .................. | G06N 5/003 |
| 2021/0110271 A1* | 4/2021 | Gendron-Bellemare | .................... | G06N 3/084 |

OTHER PUBLICATIONS

Unknown author, "Ender's Game (film)—Wikipedia," (May 3, 2021) [online] (retrieved from https://en.wikipedia.org/wiki/Ender%027s_Game_(film)), 15 pages.
Unknown author, "The Last Starfighter—Wikipedia," (May 3, 2021) [online] (retrieved from https://en.wikipedia.org/wiki/The_Last_Starfighter), 8 pages.

* cited by examiner

*Primary Examiner* — Pierre E Elisca
(74) *Attorney, Agent, or Firm* — Fish & Richardson P.C.

(57) ABSTRACT

Methods, systems, and apparatus, including computer programs encoded on a computer storage medium, for training an action selection system used to select actions to be performed by an agent interacting with a target environment to perform a task in the target environment. In one aspect, a method comprises: obtaining a target environment model of the target environment; modifying the target environment model of the target environment to generate an obfuscated environment model of an obfuscated environment that represents an obfuscation of the target environment; obtaining, from each of a plurality of users, one or more obfuscated environment trajectories that represent interaction of the user with the obfuscated environment through the corresponding obfuscated environment simulation; mapping each of the obfuscated environment trajectories to a corresponding target environment trajectory; and training the action selection system on the target environment trajectories.

20 Claims, 4 Drawing Sheets

REINFORCEMENT LEARNING USING OBFUSCATED ENVIRONMENT MODELS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations for training an action selection system that is configured to select actions to be performed by an agent interacting with a target environment to perform a task.

According to a first aspect, there is provided a method performed by one or more data processing apparatus for training an action selection system used to select actions to be performed by an agent interacting with a target environment to perform a task in the target environment, the method comprising: obtaining a target environment model of the target environment; modifying the target environment model of the target environment to generate an obfuscated environment model of an obfuscated environment that represents an obfuscation of the target environment; receiving, from each of a plurality of users, a request to interact with the obfuscated environment through an obfuscated environment simulation that implements the obfuscated environment model; providing, to each of the plurality of users, access to a corresponding obfuscated environment simulation that implements the obfuscated environment model; obtaining, from each of the plurality of users, one or more obfuscated environment trajectories that represent interaction of the user with the obfuscated environment through the corresponding obfuscated environment simulation; mapping each of the obfuscated environment trajectories representing interaction with the obfuscated environment to a corresponding target environment trajectory representing interaction with the target environment; and training the action selection system used to select actions to be performed by the agent interacting with the target environment to accomplish the task in the target environment on the target environment trajectories.

In some implementations, the target environment model of the target environment defines a set of possible actions that can be performed to interact with the target environment, and modifying the target environment model of the target environment comprises: modifying the set of possible actions that can be performed to interact with the target environment.

In some implementations, modifying the set of possible actions that can be performed to interact with the target environment comprises: removing one or more actions from the set of possible actions that can be performed to interact with the target environment, adding one or more actions to the set of possible actions that can be performed to interact with the target environment, or both.

In some implementations, modifying the target environment model of the target environment comprises: replacing an original action from a set of possible actions that can be performed to interact with the target environment by a collection of new actions that can be performed to interact with the obfuscated environment, wherein performing the collection of new actions in a particular order in the obfuscated environment corresponds to performing the original action in the target environment.

In some implementations, the target environment model of the target environment defines a transition function that models state transition dynamics of the target environment, and modifying the target environment model of the target environment comprises: modifying the transition function that models the state transition dynamics of the target environment.

In some implementations, the transition function that models the state transition dynamics of the target environment is a parametric function having a plurality of parameters, and modifying the transition function comprises: adding noise to values of the plurality of parameters of the transition function that models the state transition dynamics of the target environment.

In some implementations, the target environment model of the target environment defines a set of possible states of the target environment, and modifying the target environment model of the target environment comprises modifying the set of possible states of the target environment.

In some implementations, modifying the set of possible states of the target environment comprises removing one or more states from the set of possible states of the target environment.

In some implementations, the target environment model of the target environment includes a reward function that defines a reward received at each time step during interaction with the target environment, and modifying the target environment model of the target environment comprises modifying the reward function of the target environment model.

In some implementations, modifying the reward function of the target environment model comprises scaling the reward function of the target environment model.

In some implementations, each user of the plurality of users requests to interact with the obfuscated environment by way of a gaming application, and interaction with the obfuscated environment is presented to the user as being part of a game.

In some implementations, providing, to each of the plurality of users, access to a corresponding obfuscated environment simulation that implements the obfuscated environment model comprises: providing multiple users with access to a same obfuscated environment simulation, wherein the multiple users control respective agents that simultaneously interact with the same obfuscated environment simulation.

In some implementations, for one or more of the plurality of users, providing the user with access to an obfuscated environment simulation that implements the obfuscated environment model comprises: determining, during interaction of the user with the obfuscated environment simulation, that the user has achieved an objective; and in response to determining that the user has achieved the objective, updating the obfuscated environment simulation that is being interacted with by the user to implement a updated obfuscated environment model.

In some implementations, each obfuscated environment trajectory comprises, for each time step in a sequence of time steps: (i) a representation of a state of the obfuscated environment at the time step, (ii) a representation of an action performed by a user at the time step to interact with the obfuscated environment, and (iii) a reward received at the time step in the obfuscated environment.

In some implementations, mapping an obfuscated environment trajectory to a corresponding target environment trajectory comprises, for each time step in the obfuscated environment trajectory: mapping the representation of the state of the obfuscated environment at the time step to a representation of a corresponding state of the target environment at the time step; mapping the representation of the action performed at the time step in the obfuscated environment to a representation of a corresponding action in the target environment; and mapping the reward received at the time step in the obfuscated environment to a corresponding reward at the time step in the target environment.

In some implementations, training the action selection system on the target environment trajectories comprises: training the action selection system on the target environment trajectories using reinforcement learning techniques.

In some implementations, the reinforcement learning techniques are off-policy reinforcement learning techniques.

In some implementations, the target environment is a resource allocation environment or a real-world physical environment.

According to another aspect there is provided a system comprising: one or more computers; and one or more storage devices communicatively coupled to the one or more computers, wherein the one or more storage devices store instructions that, when executed by the one or more computers, cause the one or more computers to perform the operations of the methods described herein.

According to another aspect, there is provided one or more non-transitory computer storage media storing instructions that when executed by one or more computers cause the one or more computers to perform the operations of the methods described herein.

Particular embodiments of the subject matter described in this specification can be implemented so as to realize one or more of the following advantages.

The system described in this specification can obtain user-generated training data (e.g., generated by human users) for use in training an action selection system to perform a task in a target environment. The system can obscure the full representation of the target environment from the users, in particular, by allowing the users to interact only with an obfuscated environment that obfuscates various aspects of the target environment. The system can thus maintain at least partial privacy of the target environment while gathering large amounts of user-generated training data for training the action selection system to perform the task in the target environment. For example, the system can maintain privacy of the target environment by allowing users to interact only with the obfuscated environment (i.e., rather than directly with the target environment), and by obfuscating various properties of the target environment to prevent those properties of the target environment from being exposed to users. In particular, the system can obfuscate, e.g., the state space, the action space, the state transition dynamics, and the reward functions of the target environment. Obfuscating various properties of the target environment can protect confidential information in the target environment, e.g., by reducing the likelihood that users can understand and identify the nature of the underlying target environment and the task the action selection is being trained to perform in the target environment.

Training the action selection system on the user-generated training data allows the action selection system to learn from latent strategies encoded in the user-generated training data, which can accelerate the training of the action selection system and improve the performance of the trained action selection system. For example, training the action selection system on the user-generated training data can enable the action selection system to achieve an acceptable performance on a task in the target environment over fewer training iterations, thus reducing consumption of computational resources (e.g., memory and computing power) during training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
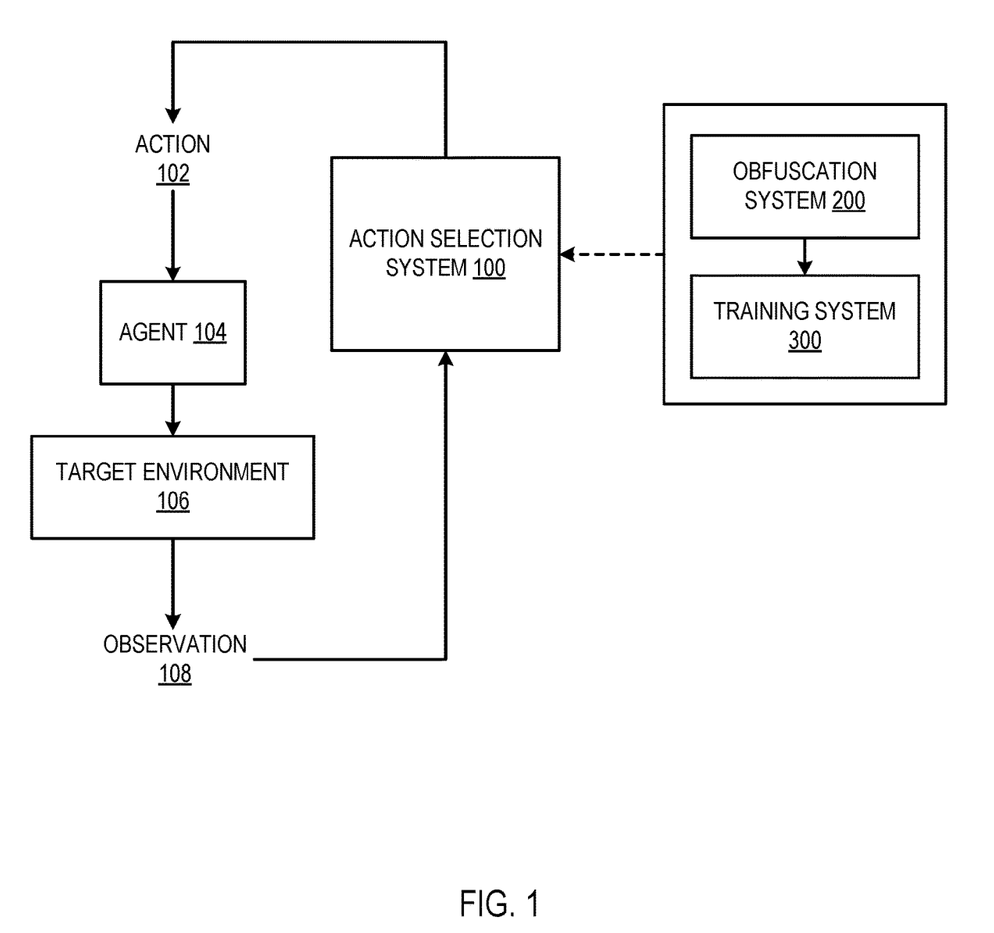
FIG. 1 is a block diagram that shows an action selection system, an obfuscation system, and a training system.

This specification describes techniques for training an action selection system 100, e.g., as shown in FIG. 1. The action selection system 100 is an example of a system implemented as computer programs on one or more computers in one or more locations in which the systems, components, and techniques described below are implemented. The action selection system 100 is configured to select actions 102 to be performed by an agent 104 interacting with a specified "target" environment 106 over a sequence of time steps to perform a task.

The target environment 106 can be, e.g., a resource allocation environment, a real-world physical environment, or any other appropriate environment, as will be described in more detail below.

The action selection system 100 can be configured to receive an observation 108 characterizing a current state of the target environment 106 at each time step, and to process the observation 108 using an action selection neural network to generate an action selection output. The action selection output can include a respective score for each action in a set of possible actions that can be performed by the agent 104 to interact with the target environment 106. The action selection system 100 can use the action selection output to select an action 102 to be performed by the agent 104 at the time step in response to the observation 108, e.g., by selecting the action that is associated with the highest score by the action selection output.

The action selection neural network can have any appropriate neural network architecture that enables it to perform its described functions. In particular, the action selection neural network can include any appropriate neural network layers (e.g., fully-connected or convolutional layers) arranged in any appropriate configuration (e.g., as a sequence of layers).

The action selection system 100 can be trained using: (i) an obfuscation system 200, and (ii) a training system 300.

The obfuscation system 200 receives data defining a model of the target environment, and modifies the target environment model to generate a model of an "obfuscated" environment that represents an obfuscation of the target environment, e.g., where various features of the target environment have been obfuscated. Generally, a model of an environment (e.g., of the target environment or of the obfuscated environment) can define: (i) a set of possible actions that can be performed by an agent to interact with the environment, (ii) a set of possible states of the environment, (iii) a transition function of the environment, and (iv) a reward function of the environment, as will be described in more detail below.

The obfuscation system 200 enables users (e.g., human users) to interact with simulations of the obfuscated environment, e.g., through a gaming application that presents interaction with the obfuscated environment as being part of a game, e.g., a massively multi-player online game (MMOG). The obfuscation system 200 provides trajectories representing interactions of the users with the obfuscated environment to the training system 300 for use in training the action selection system 100. An example of an obfuscation system is described in more detail below with reference to FIG. 2.

The training system 300 maps the obfuscated environment trajectories to corresponding trajectories representing interaction with the target environment, and trains the action selection system 100 to perform the task in the target environment based on the target environment trajectories using reinforcement learning techniques. An example of a training system is described in more detail below with reference to FIG. 3.

Figure 2:
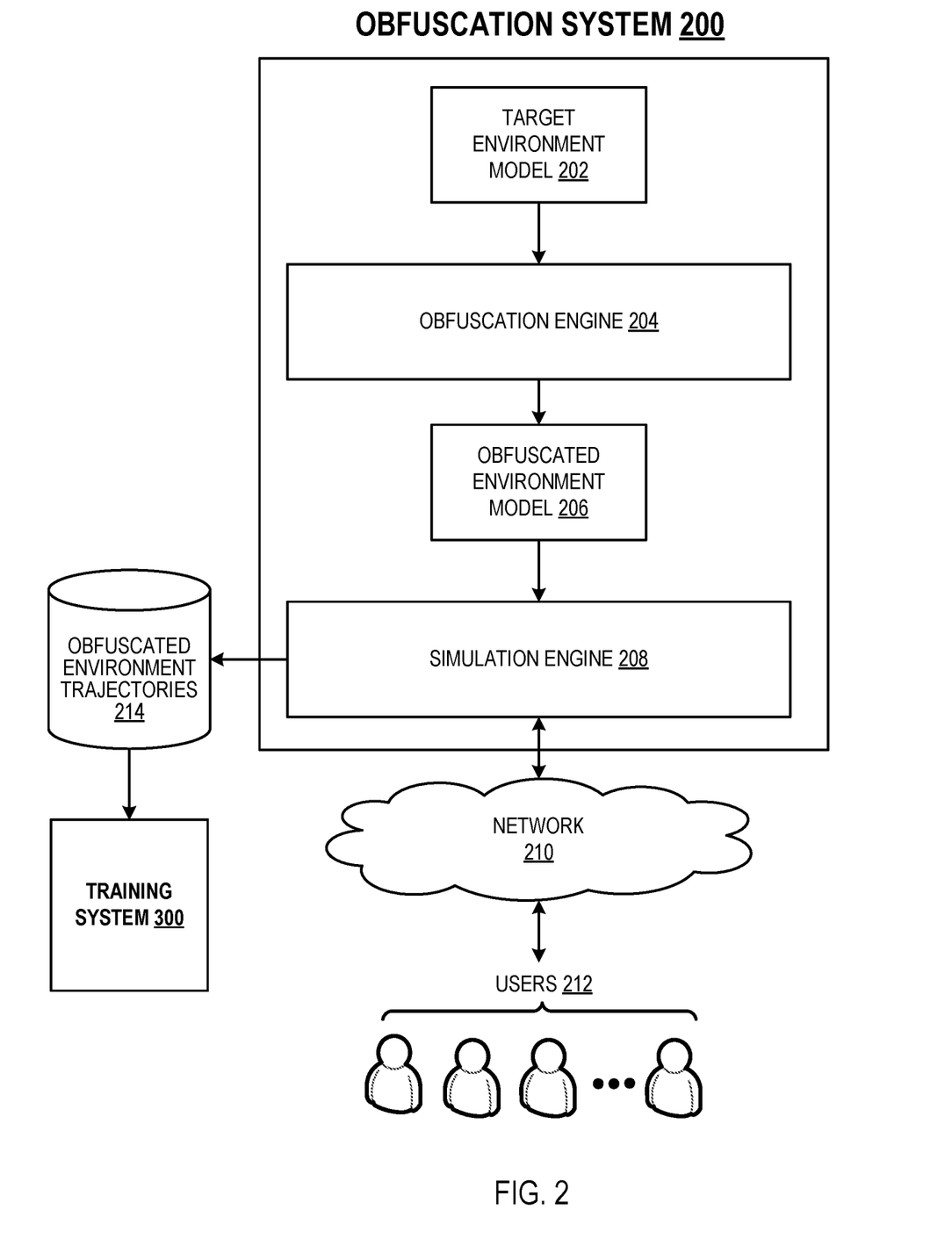
FIG. 2 shows an example obfuscation system.

FIG. 2 shows an example obfuscation system 200. The obfuscation system 200 is an example of a system implemented as computer programs on one or more computers in one or more locations in which the systems, components, and techniques described below are implemented.

The obfuscation system 200 is configured to receive data representing a target environment model 202, i.e., that models a target environment.

The target environment model 202 can define: (i) a set of possible actions that can be performed by an agent to interact with the target environment, (ii) a set of possible states of the target environment, (iii) a transition function of the target environment, and (iv) a reward function of the target environment.

The set of possible actions that can be performed by an agent to interact with the target environment can be, e.g., a finite set of possible actions indexed by $\{1, \ldots, N\}$, where N is some positive integer value, or a continuous set of possible actions, e.g., indexed by points in an interval [a, b], where a and b are real values. In some implementations, the set of possible actions can be indexed by a multi-dimensional index set, e.g., $\{1, \ldots, N_1\} \times \{1, \ldots, N_2\} \times \ldots \times \{1, \ldots, N_m\}$, where $N_1, \ldots, N_m$ are positive integer values.

Each state in the set of possible states of the target environment can be represented, e.g., by one or more ordered collections of numerical values, e.g., vectors or matrices of numerical values.

The transition function of the target environment can define, for each given action that can be performed by the agent and each given state of the target environment, a next state that the target environment would transition into if the given action is performed while the target environment is in the given state. Optionally, the transition function can represent uncertainty and randomness in the target environment. For example, for each given action and each given state, the transition function can define a corresponding probability distribution over multiple possible next states of the environment. The probability for each next state defines a likelihood that the target environment would transition into the next state if the given action is performed while the target environment is in the given state.

The transition function can be implemented in any of a variety of ways. A few example implementations of the transition function are described in more detail next.

In one example, the transition function can be a neural network that is configured to process a representation of a current state of the target environment and a current action performed by the agent to generate an output that defines a representation of a predicted next state of the target environment. Optionally, the neural network can be configured to additionally process one or more preceding states of the target environment, i.e., in addition to the current state of the target environment. Optionally, rather than generating the predicted next state of the target environment, the transition function can generate parameters of a probability distribution, e.g., a Normal distribution, over the predicted next states of the environment. The neural network can have any appropriate neural network architecture that enables it to perform its described function, e.g., including any appropriate neural network layers (e.g., fully-connected or convolutional layers) arranged in any appropriate configuration (e.g., as a sequence of layers).

In another example, the transition function can be a tabular representation, e.g., where each row of the tabular representation defines: (i) a possible current state of the target environment, (ii) a possible action that can be performed in response to the current state, and (iii) a predicted next state of the target environment.

The reward function of the target environment can define rewards that would be received by an agent at each time step as the agent interacts with the target environment over a sequence of time steps to perform a task. The reward received by the agent at each time step can be represented, e.g., by a numerical value. The reward function can define the reward received by the agent at each time step based on, e.g., the state of the target environment at the time step, the action performed by the agent at the time step, or both. The reward received by the agent at each time step can represent, e.g., whether the agent has accomplished a task, or the progress of the agent towards accomplishing a task.

The target environment model can represent any of a variety of possible target environments. A few examples of possible target environments are described in more detail next.

In one example, the target environment can be a resource allocation environment, where the agent represents an entity (e.g., organization, e.g., business) operating within the resource allocation environment. Optionally, the target environment can include one or more other entities, i.e., other than the entity represented by the agent (e.g., the other entities can represent other organizations in the resource allocation environment, e.g., competitors of or suppliers to an organization represented by the agent).

Each possible action that can be performed by the agent in the resource allocation environment can represent a resource allocation action, e.g., that defines a respective change to an amount of resources (e.g., funding or personnel) that the entity provides to a respective unit (e.g., department or project within an organization represented by the agent). Other examples of possible actions can include, e.g., modifying supply chains, reconfiguring manufacturing plants, modifying shipping or logistical operations, modifying product pricing (e.g., to implement multi-market price discrimination), modifying product features, or modifying timelines for introducing products into markets.

Each state of the resource allocation environment can characterize, e.g., resources being received by the agent (e.g., revenue to an entity represented by the agent), resources being expended by the agent (e.g., expenses of an entity represented by the agent), efficiency of the agent (e.g., productivity of personnel working for an entity represented by the agent), etc.

The transition function for the resource allocation environment can simulate the effects of various resource allocations by the entity represented by the agent on the state of the resource allocation environment.

The reward function for the resource allocation environment can be based, e.g., on a performance of the entity represented by the agent in the resource allocation environment. For example, if the entity represented by the agent is an organization, then the reward function can be a function (e.g., a linear combination) of one or more of: an operating margin of the organization, a profit of the organization, a time required by the organization to achieve an objective (e.g., delivering a product to market), etc.

In another example, the target environment can be a real-world physical environment, where the agent represents an entity acting in the physical environment, e.g., the agent can represent a robot, a mechanical arm, or an autonomous or semi-autonomous land, sea, or air vehicle.

The possible actions that can be performed by the agent in the physical environment can include, e.g., applying torques to the joints of a robot or a mechanical arm, or steering or acceleration control signals provided to an autonomous or semi-autonomous land, sea, or air vehicle.

Each state of the physical environment can characterize, e.g., the location, orientation, speed, and acceleration of objects located within the physical environment.

The transition function for the physical environment can include can simulate the effects of various actions performed by the agent in the physical environment, e.g., using an appropriate physics engine to simulate the dynamics of the physical environment.

The reward function for the physical environment can be based, e.g., on a progress of the entity represented by the agent in performing a task in the physical environment. If the agent represents a robot or a mechanical arm, then the task can be, e.g., to grasp a physical object in the environment and move it to another location in the environment. If the agent represents an autonomous land, sea, or air vehicle, then the task may be a navigation task, e.g., navigating to a specified destination in the environment.

In another example, the target environment can be a natural resource environment, e.g., a forestry, farming, fishing, or mining environment, where the agent represents an entity (e.g., an organization) controlling or managing the natural resource environment.

Possible actions that can be performed by the agent include, e.g., scheduling planting and harvesting timelines for specified crops in a farming environment, or setting maximum allowable catch-rates in a fishing environment.

Each state of the natural resource environment can characterize, e.g., current levels of various resources in the environment (e.g., current yields of various crops in a farming environment), rates of change in the levels of various resources in the environment (e.g., rates of change in fish populations in a fishing environment), levels of pollutants or ecological damage in the environment, or a combination thereof.

The transition function for the natural resource environment can simulate the effects of various actions performed by the agent on the state of the natural resource environment.

The reward function for the natural resource environment can be based on yields of natural resources (e.g., crop yields in a farming environment, e.g., measured in tons) extracted from the natural resource environment.

Data defining the target environment model 202 can be specified or provided to the system 200 by an operator of the system 200. The operator can be a remotely located operator that provides the target environment model 202 to the system 200 through an interface (e.g., an application programming interface (API) made available by the system 200) by way of a data communications network (e.g., the internet).

The system 200 provides the target environment model 202 to an obfuscation engine 204. The obfuscation engine 204 is configured to modify the target environment model 202 to generate a different environment model, referred to as an "obfuscated" environment model 206. The obfuscated environment model 206 can be understood as modeling an obfuscated environment that differs in one or more ways from the target environment and thus obfuscates the target environment, e.g., from the perspective of a user interacting with a simulation of the obfuscated environment.

The obfuscation engine 204 can modify the target environment model 202 in any of a variety of ways. A few of examples of possible modifications to the target environment model 202 are described in more detail next.

In some implementations, the obfuscation engine 204 can modify the target environment model 202 by renaming various features of the target environment. For example, the target environment can be a resource allocation environment, and the obfuscation engine 204 can assign new names to various resources in the target environment, e.g., one resource in the target environment could renamed as a "magic potion," while another resource in the target environment could be renamed as "elven workers." A user interacting with the obfuscated environment would be exposed to the obfuscated names rather than the original feature names, thus obfuscating the nature of the target environment.

In some implementations, the obfuscation engine 204 can modify the target environment model 202 by modifying the set of possible actions that can be performed to interact with the target environment. For example, the obfuscation engine 204 can define the set of possible actions that can be performed to interact with the obfuscated environment by: (i) removing one or more actions from the set of possible actions in the target environment model, (ii) adding one or more new actions to the set of possible actions in the target environment model, or (iii) both.

In one example, the target environment can be a resource allocation environment (as described above), and the obfuscated environment can include new resources that are not present in the target environment. In this example, the obfuscation engine 204 can add new actions to the set of possible actions of the target environment model, where each new action represents a resource allocation action for a new resource, e.g., that defines a change to the allocation of the new resource.

In another example, the target environment can be a resource allocation environment, and the obfuscated environment includes less than all of the resources that are included in the target environment. In this example, the obfuscation engine 204 can remove one or more actions from the set of possible actions of the target environment model. In particular, the obfuscation engine 204 can remove those actions from the set of possible actions of the target environment model that are resource allocation actions for resources that are not included in the obfuscated environment.

In another example, the obfuscation engine 204 replace one action from the set of possible actions that can be performed in the target environment by a set of multiple new actions that can be performed in the obfuscated environment. Performing the new actions in a particular sequence in the obfuscated environment can have the equivalent effect of performing the original action in the target environment.

In some implementations, the obfuscation engine 204 can modify the target environment model 202 by modifying the set of possible states of the target environment model 202. A few examples of modifications to the set of possible states of the target environment model are described in more detail next.

In one example, the target environment can be a resource allocation environment, and the obfuscation engine 204 can modify the target environment by mapping one resource in the target environment to a set of multiple obfuscated resources in the obfuscated environment. The value of the original resource in the target environment can be defined, e.g., as a sum (or other combination) of the corresponding obfuscated resources in the obfuscated environment. In this example, each possible state of the target environment can define, e.g., a particular allocation of the original resource by the agent, while each possible state of the obfuscated environment can define a respective allocation of each of the multiple obfuscated resources. That is, the obfuscation engine 204 can modify the possible states of the target environment to define the allocation of the obfuscated resources rather than the allocation of the original resource.

In another example, the target environment can be a resource allocation environment, and the obfuscated environment can include one or more new resources that are not derived from any of the resources in the target environment. In this example, obfuscation engine 204 can modify the possible states of the target environment to define the allocation of the new resources (i.e., which were not defined in the original state representation of the target environment).

In another example, the obfuscation engine 204 can modify the set of possible states of the target environment model 202 by removing one or more possible states of the target environment model 202. For convenience, the removed states may be referred to as "out of bounds" states, and the remaining states may be referred to as "in bounds" states. The obfuscation engine 204 can also modify the respective set of actions available to the agent when the obfuscated environment is in each in bounds state by removing any actions that, if performed by the agent, would cause the obfuscated environment to transition into an out of bounds state. Thus, the obfuscation engine 204 can modify the target environment to silo an agent interacting with the obfuscated environment in a region of the target environment, e.g., corresponding to the set of in bounds states.

In some implementations, the obfuscation engine 204 can modify the target environment model 202 by modifying the transition function of the target environment model.

In one example, the transition function is implemented as a parameterized function, e.g., a neural network having a set of neural network parameters (as described above), and the obfuscation engine 204 modifies the transition function by adding noise to the values of the parameters of the transition function. "Noise" can refer to random values that are sampled from a probability distribution, e.g., a Normal distribution with predefined mean and variance parameters. Adding noise to the parameter values of the transition function can have the effect, e.g., of obfuscating the precise dynamics of state transitions in the target environment.

In another example, the obfuscation engine 204 can modify the transition function by defining that, at certain (e.g., randomly selected) time steps in the obfuscated environment, the obfuscated environment transitions into a predefined or randomly selected state that would not otherwise be accessible from the current state of the obfuscated environment.

In some implementations, the obfuscation engine 204 can modify the target environment model 202 by modifying the reward function of the target environment model. A few examples of modifications to the reward function of the target environment model are described in more detail next.

In one example, the obfuscation engine 204 can define the obfuscated reward function of the obfuscated environment model as a scalar multiple (or some other function) of the reward function of the target environment.

In another example, the obfuscation engine 204 can add one or more "decoy" reward functions to the obfuscated environment model that are unrelated to the reward function of the target environment model. For example, a decoy reward function in the obfuscated environment model can measure, at each time step, an amount of a new resource that has been accumulated by the agent in the obfuscated environment, i.e., where the new resource is a decoy resource that is not present in the target environment.

In another example, the obfuscation engine 204 can define the obfuscated reward at each time step to be equal to the corresponding reward in the target environment at the time step with a specified probability, and otherwise equal to zero (or some other predefined value).

In another example, the obfuscation engine 204 can withhold a specified (e.g., predefined or randomly selected) portion of a reward in the obfuscated environment at each time step, and provide the withheld portion of the reward to the agent at a future time step. The future time step, i.e., when the withheld portion of the reward is provided to the agent, can be a predefined or randomly selected number of time steps after the current time step. The total (i.e., cumulative) obfuscated reward received by the agent along the trajectory in the obfuscated environment can be maintained, or in the case where the time-discounting is used in calculating cumulative rewards, can be approximately maintained, which can thereby facilitate using the obfuscated environment trajectory for subsequent reinforcement learning training (as will be described in more detail below).

In another example, the obfuscation engine 204 can determine the obfuscated reward at each time step to be a cumulative measure (e.g., sum) of the rewards received by multiple agents interacting with the environment, e.g., thus obfuscating the individual reward received by each agent.

Various other techniques for obfuscating the target environment model are possible. In one example, multiple agents (e.g., each controlled by respective users) can be interacting with one or more instances of the obfuscated environment. At each of one or more time steps, the system 200 can apply a "shuffling" operation to permute the agents being controlled by the users, e.g., by assigning each user control of a new agent that was previously being controlled by a different user. The system 200 can apply the shuffling operation, e.g., at predefined intervals, or at randomly selected time steps. Shuffling control of the agents can have the effect of preventing any user from controlling a single agent throughout the entire span of the interaction of that agent with the obfuscated environment, thus potentially concealing aspects of the obfuscated and target environments from the users.

The system 200 includes a simulation engine 208 that is configured to implement the obfuscated environment model 206 generated by the obfuscation engine 204. More specifically, the simulation engine 208 can enable a user 212 to interact with a simulation of the obfuscated environment represented by the obfuscated environment model 206.

The simulation engine 208 is configured to receive, at each time step in the obfuscated environment, data that represents an action to be performed at the time step by an agent interacting with the obfuscated environment. The simulation engine 208 processes data representing the action and a current state of the obfuscated environment at the time step using the transition function of the obfuscated environment model to determine a next state that the obfuscated environment transitions into at the next time step. In some cases, the transition function generates parameters of a probability distribution over a set of possible next states of the obfuscated environment, and the simulation engine 208 samples the next state of the environment in accordance with the probability distribution. The simulation engine 208 also generates one or more obfuscated rewards for the time step using the one or more obfuscated reward functions of the obfuscated environment model 206. The simulation engine 208 then outputs a representation of the next state of the obfuscated environment (which can be referred to for convenience as an "observation" of the next state of the obfuscated environment) and the one or more obfuscated rewards.

The system 200 can enable a remotely located user (i.e., that is located remotely from the system 200) to interact with a simulation of the obfuscated environment over a data communications network 210, e.g., the internet. More specifically, a user 212 can interact with an interface (e.g., a graphical user interface (GUI)) of an application installed on a user device (e.g., a desktop computer or a mobile device) to select actions to be performed by an agent in the obfuscated environment. The user device application can transmit data representing the actions to be performed by the agent in the obfuscated environment to the simulation engine 208 over the network 210. The simulation engine 208 can process the actions selected by the user to roll out simulations of the obfuscated environment, while transmitting data representing the states of the obfuscated environment and the values of the obfuscated rewards received by the agent to the user device application over the network 210. The user device application can present representations of the states of the obfuscated environment and the obfuscated rewards received in the obfuscated environment to the user in any appropriate format, e.g., in a graphical format, a textual format, or a combination thereof.

In some implementations, the user device application that enables a user 212 to interact with a simulation of the obfuscated environment can be a gaming application, i.e., that presents the interaction of the user with the obfuscated environment as being part of a game, e.g., a MMOG. The gaming application can present the obfuscated rewards received as a result of the user interaction with the obfuscated environment as "game scores," e.g., that characterize the performance of the user in the game. The objective of a user playing the game can be to maximize the game scores achieved by the user through gameplay. Users can be incentivized to play the game, e.g., for entertainment, for educational purposes, or both.

As each user 212 interacts with the obfuscated environment (i.e., through the simulation of the obfuscated environment implementing an obfuscated environment model 206), the system 200 can store obfuscated environment trajectories 214 that represent the interaction of the user with the obfuscated environment. Generally, a trajectory representing interaction with an environment (e.g., the obfuscated environment or the target environment) can include, for each time step in a sequence of one or more time steps: (i) a representation of the state of the environment at the time step, (ii) an action performed by the agent (e.g., user) at the time step to interact with the environment, and (iii) a reward received at the time step.

The obfuscated environment trajectories 214 generated by user interactions with the obfuscated environment encode user-generated strategies for performing tasks (e.g., maximizing game scores) in the obfuscated environment. These user-generated strategies can be relevant to performing analogous tasks in the target environment, and can therefore be exploited to train an action selection system to perform analogous tasks in the target environment. To this end, the system 200 provides the obfuscated environment trajectories 214 to a training system 300 for use in training the action selection system to perform tasks in the target environment. An example implementation of the training system 300 is described in more detail with reference to FIG. 3.

The system 200 can instantiate multiple instances of obfuscated environment simulations that each implement respective obfuscated environment models and are each interacted with by a respective set of one or more users. Optionally, the system 200 can randomly vary the initial state of the obfuscated environment (i.e., at the first time step) between the instances of the obfuscated environment simulations. For example, as part of instantiating an instance of an obfuscated environment simulation, the system 200 can sample the initial state of the obfuscated environment from a set of possible initial states of the obfuscated environment. Varying the obfuscated environment model and the initial state of the obfuscated environment between instances of the obfuscated environment simulations can enable the system 200 to generate a more diverse set of obfuscated environment trajectories 214, thereby enabling the action selection system to be trained more effectively.

Generally, a user interacting with an obfuscated environment model 206 through the simulation engine 208 can have difficulty in identifying and understanding certain aspects of the underlying target environment model 202, i.e., as a result of the obfuscation operations performed by the obfuscation engine 204. Therefore, the system 200 can obtain obfuscated environment trajectories 214 encoding a diverse set of effective strategies that are relevant to solving tasks in the target environment while maintaining at least partial privacy of the target environment.

The description which follows will primarily describe user interaction with the obfuscated environment as occurring as part of a game that is played by users, e.g., by interacting with gaming applications on user devices, as described above. However, it should be understood that this description is not intended to limit the scope of the provided disclosure or of possible implementations of the techniques described herein to the context of gaming.

A gaming application on the user device can enable a user 212 to request to play the game in a variety of possible formats. In one example, a user can request to play the game in a "single player" format, where the user controls an agent in the obfuscated environment, and any other agents in the obfuscated environment (and all other aspects of the obfuscated environment) are controlled by the simulation engine 208. In another example, a user can request to play the game in a "multi-player" format, where multiple users simultaneously control respective agents interacting with a same instance of the obfuscated environment. A set of users playing the game in multi-player format can be partitioned into a set of teams that each include one or more users. The game can be configured, e.g., so that the teams compete against each other, e.g., to achieve the highest game scores, or so that the teams collaborate to achieve a joint objective, e.g., a highest joint game score.

Optionally, during the course of gameplay by a user or team of users, the system 200 can modify the obfuscated environment model 206 that governs the dynamics of the simulation of the obfuscated environment. For example, the system 200 can modify the obfuscated environment model 206, e.g., to enable the users to access a different (e.g., larger) region of the obfuscated environment, to enable the users to perform a different (e.g., larger) set of possible actions, or both. In some implementations, the system 200 can enable a user or a team of users to complete a "quest," i.e., an in-game task, and upon successful completion of the quest, the system 200 can modify the obfuscated environment model 206. For example, the system 200 can enable the users to perform a larger set of possible actions, and then provide the users with the option to initiate one or more new quests.

The set of possible quests available to users in the game environment can be arranged into a "curriculum," e.g., where a user or team or users must complete certain quests as a pre-requisite to gaining access to certain other quests. The system 200 can configure the quest curriculum to enable users or teams of users to "specialize" at performing certain tasks or groups of tasks in the obfuscated environment. Obfuscated environment trajectories 214 generated by users that are specialized at performing certain tasks in the obfuscated environment can encode particularly effective strategies for solving analogous problems in the target environment, and can thereby enable the action selection system to be trained more effectively.

The game application can include a "leaderboard" feature that identifies users who have achieved specified in-game objectives (e.g., completing certain quests or achieving certain game scores). The game application can also include features that enable users to review gameplay logs.

Figure 3:
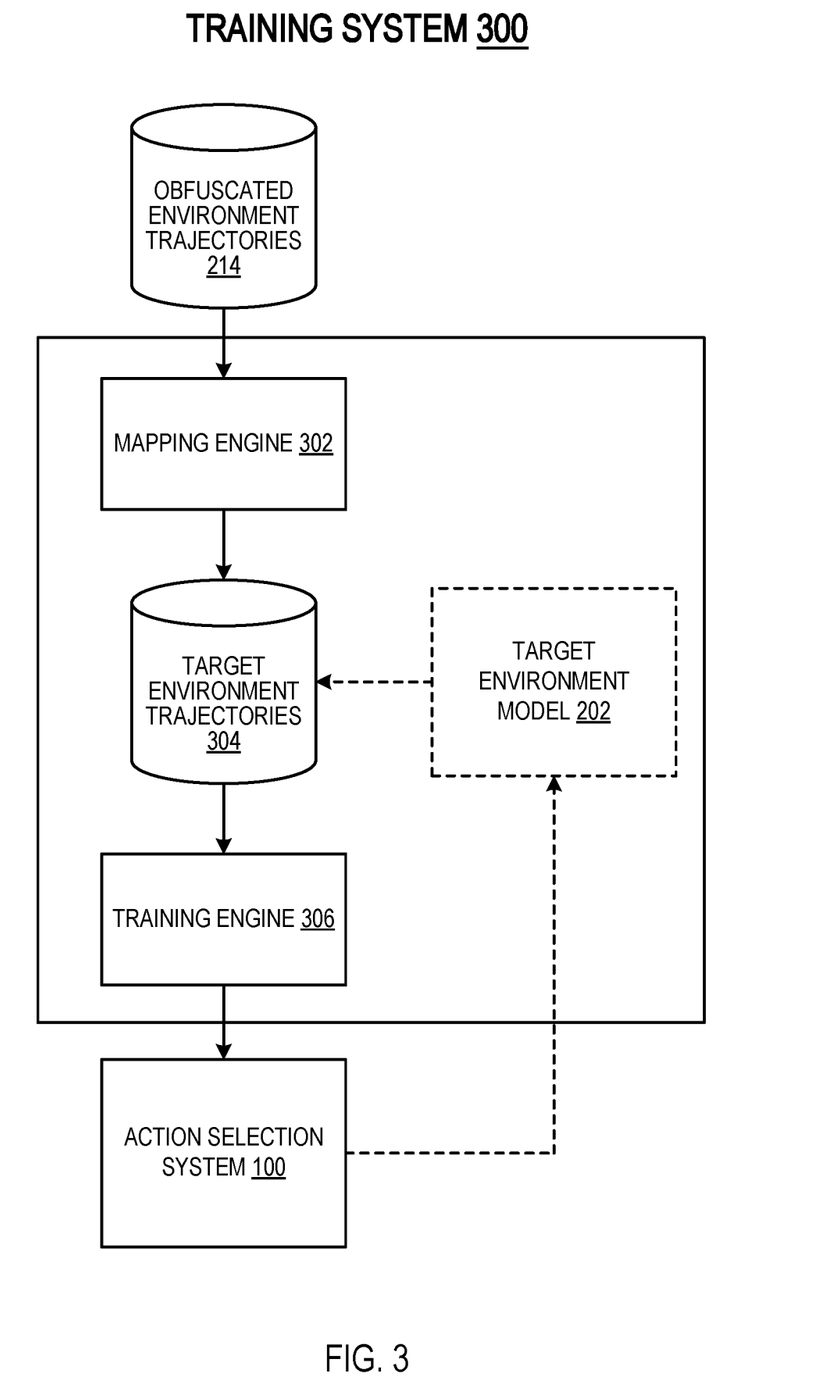
FIG. 3 shows an example training system.

FIG. 3 shows an example training system 300. The training system 300 is an example of a system implemented as computer programs on one or more computers in one or more locations in which the systems, components, and techniques described below are implemented.

The system 300 is configured to receive a set of obfuscated environment trajectories 214 that each represent interaction of a user with an obfuscated environment simulation that implements an obfuscated environment model. The obfuscated environment trajectories 214 can be generated by the obfuscation system 200 described with reference to FIG. 1.

Each obfuscated environment trajectory includes, for each time step in a sequence of one or more time steps: (i) a representation of the state of the obfuscated environment at the time step, (ii) an action performed by the user at the time step to interact with the obfuscated environment, and (iii) one or more reward received in the obfuscated environment at the time step, as described above.

The system 300 includes a mapping engine 302 and a training engine 306, which are each described in more detail next.

The mapping engine 302 is configured to map each obfuscated environment trajectory 214 onto a corresponding target environment trajectory, i.e., representing interaction with the target environment.

To map an obfuscated environment trajectory 214 onto a corresponding target environment trajectory 304, the mapping engine 302 maps the respective obfuscated environment observation at each time step in the obfuscated environment trajectory onto a corresponding target environment observation at the time step in the target environment trajectory. The system 300 can map the obfuscated environment observation at a time step onto the corresponding target environment observation, e.g., by removing any features of the obfuscated environment observation that do not relate to any aspect of the target environment. For example, if the obfuscated environment includes new resources that are not present in the target environment, then the system 300 can remove any features form the obfuscated environment observation that characterize the new resources.

To map an obfuscated environment trajectory 214 onto a corresponding target environment trajectory 304, the mapping engine 302 also maps the respective action performed at each time step in the obfuscated environment trajectory onto a corresponding action for the time step in the target environment trajectory.

If the action performed at a time step in the obfuscated trajectory corresponds to an action in a set of possible actions that can be performed in the target environment, then the system 300 can map the action from the obfuscated trajectory onto the corresponding action in the target environment.

If the action performed at a time step in the obfuscated trajectory is a new action that does not correspond to any of the possible actions that can be performed in the target environment, then the system 300 can map the action from the obfuscated trajectory onto a "null" action. Performing the null action in the target environment has no effect on the state of the target environment.

In some cases, the obfuscated environment trajectory 214 can include a sequence of actions that, when performed in the obfuscated environment, have the equivalent effect of performing a single "rolled up" action in the target environment. The system 300 can map one of the actions from the sequence of actions in the obfuscated environment trajectory onto the corresponding rolled up action in the target environment trajectory. The system can map the remaining actions form the sequence of actions in the obfuscated environment trajectory to null actions in the target environment trajectory.

To map an obfuscated environment trajectory 214 onto a corresponding target environment trajectory, the mapping engine 302 also maps the one or more rewards received at each time step in the obfuscated environment trajectory onto a corresponding reward at the time step in the target environment trajectory. In one example, the obfuscated environment reward is a scalar multiple of the target environment reward (as described above), and the mapping engine 302 recovers the target environment reward by rescaling the obfuscated environment reward. In another example, the obfuscated environment trajectory includes one or more decoy rewards at each time step (as described above), and the mapping engine 302 discards the decoy rewards.

The mapping engine 302 can maintain mapping data that defines: (i) a mapping from obfuscated environment observations to corresponding target environment observations, (ii) a mapping from obfuscated environment actions to corresponding target environment actions, and (iii) a mapping from obfuscated environment rewards onto target environment rewards. The mapping data can be represented, e.g., by ordered collections of numerical values, e.g., vectors or matrices of numerical values, or as tabular data, or as a combination thereof. For example, the obfuscated environment observations can be represented as M-dimensional vectors, the target environment observations can be represented as respective N-dimensional vectors, and the mapping from obfuscated environment observations onto target environment observations can be represented as an N×M-dimensional projection matrix. As another example, the mapping from obfuscated environment actions onto target environment actions can be represented as tabular data, e.g., where each row in the tabular data defines: (i) an obfuscated environment action or a sequence of obfuscated environment actions, and (ii) a corresponding target environment action or sequence of target environment actions.

The training engine 306 trains the action selection system 100 on the target environment trajectories 304 using a reinforcement learning technique. In particular, the training engine 306 trains the action selection system 100 to increase a cumulative measure of rewards (e.g., a long-term time-discounted cumulative measure of rewards) that would be received by an agent interacting with the target environment by performing actions selected using the action selection system 100. Training the action selection system 100 can enable an agent controlled by the action selection system 100 to perform tasks in the target environment more effectively, e.g., over fewer time steps. The training engine 306 can train the action selection system 100 using any appropriate reinforcement learning technique, e.g., an off-policy reinforcement learning technique, e.g., Q-learning.

Optionally, the system 300 can use the action selection system 100 to generate additional target environment trajectories 304 for use in training the action selection system 100. For example, the system 300 can generate additional target environment trajectories by using the action selection system 100 to control an agent interacting with a simulation of the target environment. Optionally, the target environment simulation can include multiple agents that are each controlled by the action selection system 100. The system 300 can use respective target environment trajectories characterizing interactions of each of the multiple agents controlled by the action selection system for use in training the action selection system (i.e., as a form of training through self-play).

After being trained, the action selection system 100 can be used for any of a variety of purposes. In one example, the target environment is a resource allocation environment, and the action selection system 100 can be used to generate recommendations for sequence of resource allocation actions to accomplished specified objectives in the resource allocation environment. In another example, the target environment is a real-world physical environment, and the action selection system 100 can be deployed to control an agent to perform specified tasks in the real-world physical environment.

Figure 4:
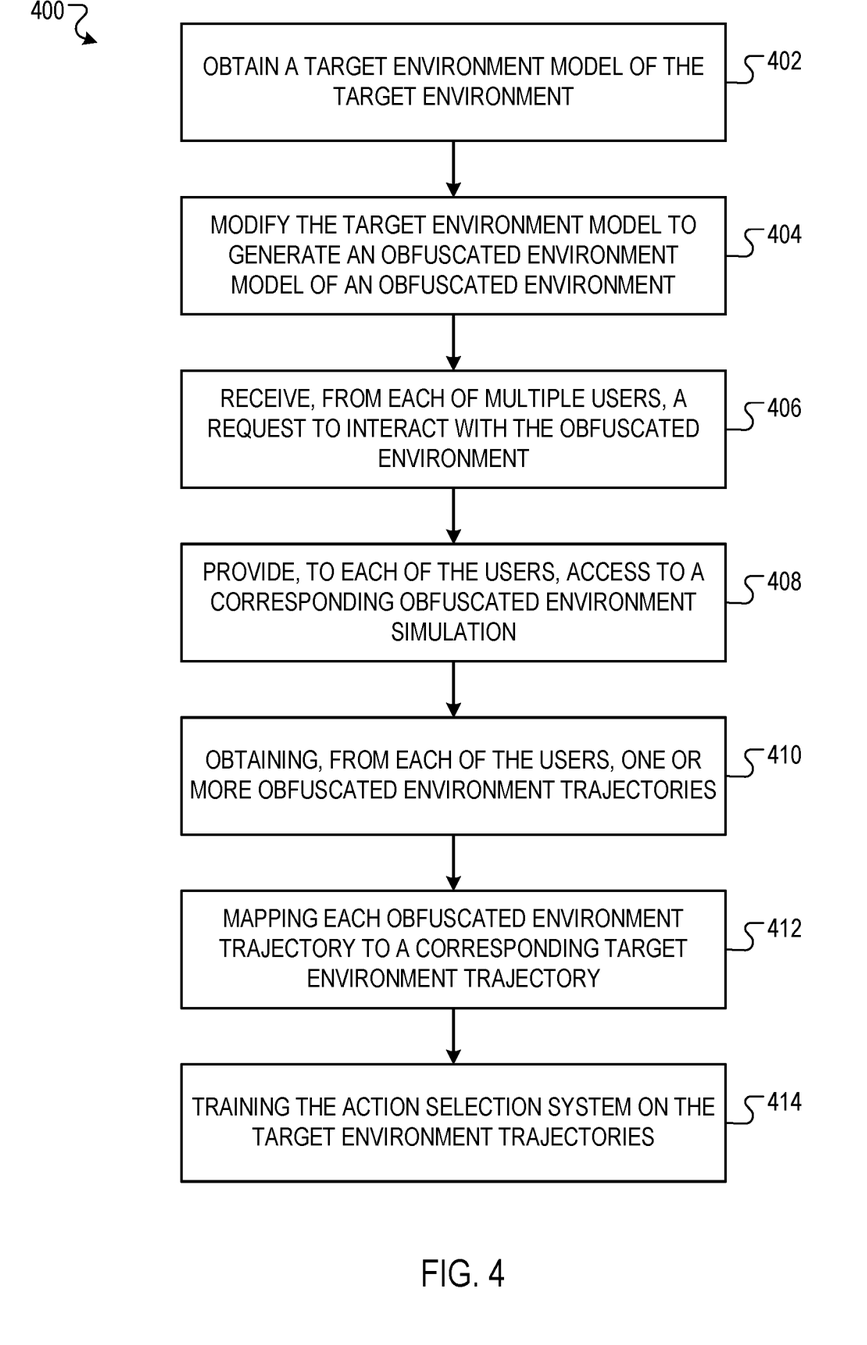
FIG. 4 is a flow diagram of an example process for training an action selection system used to select actions to be performed by an agent interacting with a target environment to perform a task in the target environment.

FIG. 4 is a flow diagram of an example process 400 for training an action selection system used to select actions to be performed by an agent interacting with a target environment to perform a task in the target environment. For convenience, the process 400 will be described as being performed by a system of one or more computers located in one or more locations. For example, a obfuscation system and a training system, e.g., the obfuscation system 200 of FIG. 2 and the training system 300 of FIG. 3, appropriately programmed in accordance with this specification, can perform the process 400.

The system obtains a target environment model of the target environment (402). The system can obtain the target environment model, e.g., from an operator of the system through an API made available by the system. The target environment model can define, e.g., a set of possible actions that can be performed to interact with the target environment, a set of possible states of the target environment, a transition function that models the state transition dynamics of the target environment, and a reward function that defines rewards received as a result of interacting with the target environment. The target environment can be, e.g., a resource allocation environment or a real-world physical environment.

The system modifies the target environment model of the target environment to generate an obfuscated environment model of an obfuscated environment that represents an obfuscation of the target environment (404). The system can modify the target environment model, e.g., by adding or removing actions from the set of possible actions that can be performed to interact with the target environment, by adding noise to the parameter values of a parametric function that implements the transition function of the target environment, by removing one or more possible states from the set of possible states of the target environment, by rescaling the reward function of the target environment, or by adding one or more decoy reward functions.

The system receives, from each of multiple users, a request to interact with the obfuscated environment through an obfuscated environment simulation that implements the obfuscated environment model (406). The users can be remotely located users that transmit the request to interact with the obfuscated environment to the system over a data communications network, e.g., the internet.

The system provides, to each of the users, access to a corresponding obfuscated environment simulation that implements the obfuscated environment model (408). Each of the users can access the corresponding environment simulation through an interface provided by a gaming application, and user interaction with the obfuscated environment can be presented to the users as being part of a game, e.g., a MMOG.

The system obtains, from each of the users, one or more obfuscated environment trajectories that represent interaction of the user with the obfuscated environment through the corresponding obfuscated environment simulation (410). Each obfuscated environment trajectory can include, for each time step in a sequence of time steps: (i) a representation of a state of the obfuscated environment at the time step, (ii) a representation of an action performed by a user at the time step to interact with the obfuscated environment, and (iii) a reward received at the time step in the obfuscated environment.

The system maps each of the obfuscated environment trajectories representing interaction with the obfuscated environment to a corresponding target environment trajectory representing interaction with the target environment (412). The system can map the representation of the state of the obfuscated environment at each time step to a representation of a corresponding state of the target environment at the time step. The system can map the representation of the action performed at each time step in the obfuscated environment to a representation of a corresponding action performed in the target environment at the time step. The system can map the reward received at each time step in the obfuscated environment to a corresponding reward at the time step in the target environment.

The system trains the action selection system used to select actions to be performed by the agent interacting with the target environment to accomplish the task in the target environment on the target environment trajectories (414). The system can train the action selection system using reinforcement learning techniques, e.g., off-policy reinforcement learning techniques.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for training an action selection system used to select actions to be performed by an agent interacting with a target environment to perform a task in the target environment, the method comprising:
    obtaining, by the one or more computers, a target environment model of the target environment;
    modifying, by the one or more computers, the target environment model of the target environment to generate an obfuscated environment model of an obfuscated environment that represents an obfuscation of the target environment;
    receiving, by the one or more computers and from each of a plurality of users, a request to interact with the obfuscated environment through an obfuscated environment simulation that implements the obfuscated environment model;
    providing, by the one or more computers and to each of the plurality of users, access to a corresponding obfuscated environment simulation that implements the obfuscated environment model;
    obtaining, by the one or more computers and from each of the plurality of users, one or more obfuscated environment trajectories that represent interaction of the user with the obfuscated environment through the corresponding obfuscated environment simulation;
    mapping, by the one or more computers, each of the obfuscated environment trajectories representing interaction with the obfuscated environment to a corresponding target environment trajectory representing interaction with the target environment; and
    training, by the one or more computers, the action selection system used to select actions to be performed by the agent interacting with the target environment to accomplish the task in the target environment on the target environment trajectories.

2. The method of claim 1, wherein the target environment model of the target environment defines a set of possible actions that can be performed to interact with the target environment, and wherein modifying the target environment model of the target environment comprises:
    modifying, by the one or more computers, the set of possible actions that can be performed to interact with the target environment.

3. The method of claim 2, wherein modifying the set of possible actions that can be performed to interact with the target environment comprises:
(i) removing, by the one or more computers, one or more actions from the set of possible actions that can be performed to interact with the target environment, (ii) adding, by the one or more computers, one or more actions to the set of possible actions that can be performed to interact with the target environment, or (iii) both.

4. The method of claim 2, wherein modifying the target environment model of the target environment comprises:
replacing, by the one or more computers, an original action from a set of possible actions that can be performed to interact with the target environment by a collection of new actions that can be performed to interact with the obfuscated environment, wherein performing the collection of new actions in a particular order in the obfuscated environment corresponds to performing the original action in the target environment.

5. The method of claim 1, wherein the target environment model of the target environment defines a transition function that models state transition dynamics of the target environment, and wherein modifying the target environment model of the target environment comprises:
modifying, by the one or more computers, the transition function that models the state transition dynamics of the target environment.

6. The method of claim 5, wherein the transition function that models the state transition dynamics of the target environment is a parametric function having a plurality of parameters, and wherein modifying the transition function comprises:
adding, by the one or more computers, noise to values of the plurality of parameters of the transition function that models the state transition dynamics of the target environment.

7. The method of claim 1, wherein the target environment model of the target environment defines a set of possible states of the target environment, and wherein modifying the target environment model of the target environment comprises modifying, by the one or more computers, the set of possible states of the target environment.

8. The method of claim 7, wherein modifying the set of possible states of the target environment comprises removing, by the one or more computers, one or more states from the set of possible states of the target environment.

9. The method of claim 1, wherein the target environment model of the target environment includes a reward function that defines a reward received at each time step during interaction with the target environment, and wherein modifying the target environment model of the target environment comprises modifying, by the one or more computers, the reward function of the target environment model.

10. The method of claim 9, wherein modifying the reward function of the target environment model comprises scaling, by the one or more computers, the reward function of the target environment model.

11. The method of claim 1, wherein each user of the plurality of users requests to interact with the obfuscated environment by way of a gaming application, and wherein interaction with the obfuscated environment is presented to the user as being part of a game.

12. The method of claim 1, wherein providing, to each of the plurality of users, access to a corresponding obfuscated environment simulation that implements the obfuscated environment model comprises:
providing, by the one or more computers, multiple users with access to a same obfuscated environment simulation, wherein the multiple users control respective agents that simultaneously interact with the same obfuscated environment simulation.

13. The method of claim 1, wherein for one or more of the plurality of users, providing the user with access to an obfuscated environment simulation that implements the obfuscated environment model comprises:
determining, by the one or more computers and during interaction of the user with the obfuscated environment simulation, that the user has achieved an objective; and
in response to determining that the user has achieved the objective:
updating, by the one or more computers, the obfuscated environment simulation that is being interacted with by the user to implement a updated obfuscated environment model.

14. The method of claim 1, wherein each obfuscated environment trajectory comprises, for each time step in a sequence of time steps: (i) a representation of a state of the obfuscated environment at the time step, (ii) a representation of an action performed by a user at the time step to interact with the obfuscated environment, and (iii) a reward received at the time step in the obfuscated environment.

15. The method of claim 14, wherein mapping an obfuscated environment trajectory to a corresponding target environment trajectory comprises, for each time step in the obfuscated environment trajectory:
mapping, by the one or more computers, the representation of the state of the obfuscated environment at the time step to a representation of a corresponding state of the target environment at the time step;
mapping, by the one or more computers, the representation of the action performed at the time step in the obfuscated environment to a representation of a corresponding action in the target environment; and
mapping, by the one or more computers, the reward received at the time step in the obfuscated environment to a corresponding reward at the time step in the target environment.

16. The method of claim 15, wherein training the action selection system on the target environment trajectories comprises:
training, by the one or more computers, the action selection system on the target environment trajectories using reinforcement learning techniques.

17. The method of claim 16, wherein the reinforcement learning techniques are off-policy reinforcement learning techniques.

18. The method of claim 1, wherein the target environment is a resource allocation environment or a real-world physical environment.

19. A system comprising:
one or more computers; and
one or more storage devices communicatively coupled to the one or more computers, wherein the one or more storage devices store instructions that, when executed by the one or more computers, cause the one or more computers to perform operations for training an action selection system used to select actions to be performed by an agent interacting with a target environment to perform a task in the target environment, the operations comprising:

obtaining, by the one or more computers, a target environment model of the target environment;

modifying, by the one or more computers, the target environment model of the target environment to generate an obfuscated environment model of an obfuscated environment that represents an obfuscation of the target environment;

receiving, by the one or more computers and from each of a plurality of users, a request to interact with the obfuscated environment through an obfuscated environment simulation that implements the obfuscated environment model;

providing, by the one or more computers and to each of the plurality of users, access to a corresponding obfuscated environment simulation that implements the obfuscated environment model;

obtaining, by the one or more computers and from each of the plurality of users, one or more obfuscated environment trajectories that represent interaction of the user with the obfuscated environment through the corresponding obfuscated environment simulation;

mapping, by the one or more computers, each of the obfuscated environment trajectories representing interaction with the obfuscated environment to a corresponding target environment trajectory representing interaction with the target environment; and training, by the one or more computers, the action selection system used to select actions to be performed by the agent interacting with the target environment to accomplish the task in the target environment on the target environment trajectories.

20. One or more non-transitory computer storage media storing instructions that when executed by one or more computers cause the one or more computers to perform operations for training an action selection system used to select actions to be performed by an agent interacting with a target environment to perform a task in the target environment, the operations comprising:

obtaining, by the one or more computers, a target environment model of the target environment;

modifying, by the one or more computers, the target environment model of the target environment to generate an obfuscated environment model of an obfuscated environment that represents an obfuscation of the target environment;

receiving, by the one or more computers and from each of a plurality of users, a request to interact with the obfuscated environment through an obfuscated environment simulation that implements the obfuscated environment model;

providing, by the one or more computers and to each of the plurality of users, access to a corresponding obfuscated environment simulation that implements the obfuscated environment model;

obtaining, by the one or more computers and from each of the plurality of users, one or more obfuscated environment trajectories that represent interaction of the user with the obfuscated environment through the corresponding obfuscated environment simulation;

mapping, by the one or more computers, each of the obfuscated environment trajectories representing interaction with the obfuscated environment to a corresponding target environment trajectory representing interaction with the target environment; and training, by the one or more computers, the action selection system used to select actions to be performed by the agent interacting with the target environment to accomplish the task in the target environment on the target environment trajectories.

\* \* \* \* \*

UNITED STATES PATENT AND TRADEMARK OFFICE
CERTIFICATE OF CORRECTION

| | | |
|---|---|---|
| PATENT NO. | : 11,144,847 B1 | Page 1 of 1 |
| APPLICATION NO. | : 17/231443 | |
| DATED | : October 12, 2021 | |
| INVENTOR(S) | : John Van Wicheren Reynders, III | |

It is certified that error appears in the above-identified patent and that said Letters Patent is hereby corrected as shown below:

On the Title Page

Item (72) Inventor: delete "John Van Wieheren Reynders, III" and replace with --John Van Wicheren Reynders, III--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*